(12) United States Patent
Pristup

(10) Patent No.: US 7,143,648 B2
(45) Date of Patent: Dec. 5, 2006

(54) MAGNETOFLUIDIC ACCELEROMETER WITH CAPACITIVE SENSING OF INERTIAL BODY POSITION

(75) Inventor: Alexander G. Pristup, Novosibirsk (RU)

(73) Assignee: Ferrolabs, Inc., Dulles, VA (US)

( * ) Notice: Subject to any disclaimer, the term of this patent is extended or adjusted under 35 U.S.C. 154(b) by 0 days.

(21) Appl. No.: 11/282,727

(22) Filed: Nov. 21, 2005

(65) Prior Publication Data

US 2006/0070443 A1 Apr. 6, 2006

Related U.S. Application Data

(63) Continuation-in-part of application No. 10/980,791, filed on Nov. 4, 2004.

(60) Provisional application No. 60/616,849, filed on Oct. 8, 2004, provisional application No. 60/614,415, filed on Sep. 30, 2004, provisional application No. 60/613,723, filed on Sep. 29, 2004.

(51) Int. Cl.
*G01P 15/125* (2006.01)
*G01P 15/18* (2006.01)

(52) U.S. Cl. .............................. 73/504.08; 73/514.32

(58) Field of Classification Search .............. 73/514.08
See application file for complete search history.

(56) References Cited

U.S. PATENT DOCUMENTS 4,043,204 A * 8/1977 Hunter et al. ............ 73/514.08
4,192,189 A * 3/1980 Presley ..................... 73/504.03
4,711,125 A * 12/1987 Morrison ................. 73/178 R
4,905,517 A * 3/1990 Crowe et al. ................ 73/654
4,991,438 A * 2/1991 Evans ..................... 73/514.08
5,780,741 A * 7/1998 Raj ......................... 73/514.08

* cited by examiner

*Primary Examiner*—Hezron Williams
*Assistant Examiner*—John C. Hanley
(74) *Attorney, Agent, or Firm*—Bardmesser Law Group

(57) ABSTRACT

An accelerometer includes an inertial body; a magnetized fluid holding the inertial body in suspension; and a plurality of capacitive elements, each forming a capacitor with the inertial body. A displacement of the inertial body produces a change of capacitance of the capacitive elements that is indicative of acceleration. The capacitive elements include at least two capacitive elements per side of the accelerometer. A housing encloses the inertial body and the magnetized fluid, and the plurality of capacitive elements are mounted on the housing. The housing can be cylindrical shaped, rectangular shaped and tetrahedral-shaped. The inertial body can include a disk-shaped magnet, an annular-shaped magnet, or be non-magnetic, or be weakly magnetic. The acceleration can be linear acceleration, angular acceleration, or three components of angular acceleration and three components of linear acceleration. A plurality of magnets magnetize the magnetic fluid.

27 Claims, 8 Drawing Sheets

MAGNETOFLUIDIC ACCELEROMETER WITH CAPACITIVE SENSING OF INERTIAL BODY POSITION

CROSS-REFERENCE TO RELATED APPLICATIONS

This application claims priority to U.S. Provisional Patent Application No. 60/616,849, entitled MAGNETOFLUIDIC ACCELEROMETER AND USE OF MAGNETOFLUIDICS FOR OPTICAL COMPONENT JITTER COMPENSATION, Inventors: SUPRUN et al., Filed: Oct. 8, 2004; U.S. Provisional Patent Application No. 60/614,415, entitled METHOD OF CALCULATING LINEAR AND ANGULAR ACCELERATION IN A MAGNETOFLUIDIC ACCELEROMETER WITH AN INERTIAL BODY, Inventors: ROMANOV et al., Filed: Sep. 30, 2004; U.S. Provisional Patent Application No. 60/613,723, entitled IMPROVED ACCELEROMETER USING MAGNETOFLUIDIC EFFECT, Inventors: SIMONENKO et al., Filed: Sep. 29, 2004, which are incorporated by reference in their entirety.

This is a continuation-in-part of U.S. patent application Ser. No. 10/980,791, filed on Nov. 4, 2004, entitled MAGNETOFLUIDIC ACCELEROMETER WITH ACTIVE SUSPENSION, incorporated herein by reference in its entirety.

BACKGROUND OF THE INVENTION

1. Field of the Invention

The present invention is related to magneto-fluidic acceleration sensors, and more particularly, to an acceleration sensor with a wide frequency response and a high dynamic range.

2. Background Art

Magneto-fluidic accelerometers are described in, e.g., U.S. patent application Ser. No. 10/836,624, filed May 3, 2004, U.S. patent application Ser. No. 10/836,186, filed May 3, 2004, U.S. patent application Ser. No. 10/422,170, filed May 21, 2003, U.S. patent application Ser. No. 10/209,197, filed Aug. 1, 2002 (now U.S. Pat. No. 6,731,268), U.S. patent application Ser. No. 09/511,831, filed Feb. 24, 2000 (now U.S. Pat. No. 6,466,200), and Russian patent application No. 99122838, filed Nov. 3, 1999. These accelerometers utilize magneto-fluidic principles and an inertial body suspended in a magnetic fluid, to measure acceleration. Such an accelerometer often includes a sensor casing (sensor housing, or "vessel"), which is filled with magnetic fluid. An inertial body ("inertial object") is suspended in the magnetic fluid. The accelerometer usually includes a number of drive coils (power coils) generating a magnetic field in the magnetic fluid, and a number of measuring coils to detect changes in the magnetic field due to relative motion of the inertial body.

When the power coils are energized and generate a magnetic field, the magnetic fluid attempts to position itself as close to the power coils as possible. This, in effect, results in suspending the inertial body in the approximate geometric center of the housing. When a force is applied to the accelerometer (or to whatever device the accelerometer is mounted on), so as to cause angular or linear acceleration, the inertial body attempts to remain in place. The inertial body therefore "presses" against the magnetic fluid, disturbing it and changing the distribution of the magnetic fields inside the magnetic fluid. This change in the magnetic field distribution is sensed by the measuring coils, and is then converted electronically to values of linear and angular acceleration. Knowing linear and angular acceleration, it is then possible, through straightforward mathematical operations, to calculate linear and angular velocity, and, if necessary, linear and angular position. Phrased another way, the accelerometer provides information about six degrees of freedom—three linear degrees of freedom (x, y, z), and three angular (or rotational) degrees of freedom ($\alpha_x$, $\alpha_y$, $\alpha_z$).

One of the disadvantages described in an accelerometer such as that described in pending application Ser. No. 10/980,791, is the use of magnetic sensors to indirectly measure the change in position of the inertial body. Such magnetic sensors may be, for example, inductive coils. Two such inductive coils are usually necessary to be positioned on each face of the "cube" of the sensors shown in pending application Ser. No. 10/980,791, if both linear and angular acceleration in all six degrees of freedom needs to be measured. The disadvantages of using such inductive sensors involve restrictions on the dimensions of the overall structure, bandwidth limitations due to the size and inductance of the sensing coils themselves. The manufacturability issue is of significant concern if mass production of the sensors is at issue. Miniaturization of the sensing coils can only be done up to a point, even if the finest gauge wire is used. After the sensing coils themselves are wound, further assembly and tweaking of the overall structure may be required. Also, additional calibration may be required, due to the non-uniformities involved in the manufacturing of the sensing coils.

Accordingly, there is a need in the art for an accelerometer that uses magneto-fluidic principles to suspend an inertial body, but avoids the use of magnetic sensors to detect the changes in position of the inertial body.

BRIEF SUMMARY OF THE INVENTION

The present invention relates to magneto-fluidic accelerometers with capacitive sensing that substantially obviates one or more of the disadvantages of the related art.

More particularly, in an exemplary embodiment of the present invention, an accelerometer includes an inertial body; a magnetized fluid holding the inertial body in suspension; and a plurality of capacitive elements, each forming a capacitor with the inertial body. A displacement of the inertial body produces a change in the capacitance, which, in turn, can produce a voltage change on the capacitive elements that is indicative of acceleration. The capacitive elements include at least two capacitive elements per side of the accelerometer. A housing encloses the inertial body and the magnetized fluid, and the plurality of capacitive elements are mounted on the housing. The housing can be cylindrical shaped, rectangular shaped and tetrahedral-shaped. The inertial body can include a disk-shaped magnet, an annular-shaped magnet, or be non-magnetic, or be weakly magnetic. The acceleration can be linear acceleration, angular acceleration, or three components of angular acceleration and three components of linear acceleration. A plurality of magnets magnetize the magnetic fluid.

In another aspect, a method of measuring acceleration includes suspending a non-magnetic object using a fluid; generating a magnetic field within the fluid; detecting a capacitive voltage change due to a change in position of the object as a result of acceleration; and calculating the acceleration as a function of the control of the magnetic field.

In another aspect, an accelerometer includes an inertial body, a magnetized fluid holding the inertial body in suspension, and a plurality of capacitive elements, each forming a capacitor with the inertial body. A displacement of the inertial body produces a voltage change on the capacitive elements, the voltage change being indicative of acceleration. The plurality of capacitive elements can include at least two capacitive elements per side of the accelerometer. A housing encloses the inertial body and the magnetized fluid, such that the plurality of capacitive elements are mounted on the housing. The housing can be cylindrical shaped, rectangular shaped or, e.g., tetrahedral-shaped. The inertial body can include a disk-shaped magnet, or an annular-shaped magnet. The acceleration can include linear acceleration, angular acceleration, or three components of angular acceleration and three components of linear acceleration. The inertial body can be non-magnetic or weakly magnetic.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to embodiments of the present invention, examples of which are illustrated in the accompanying drawings.

Figure 1:
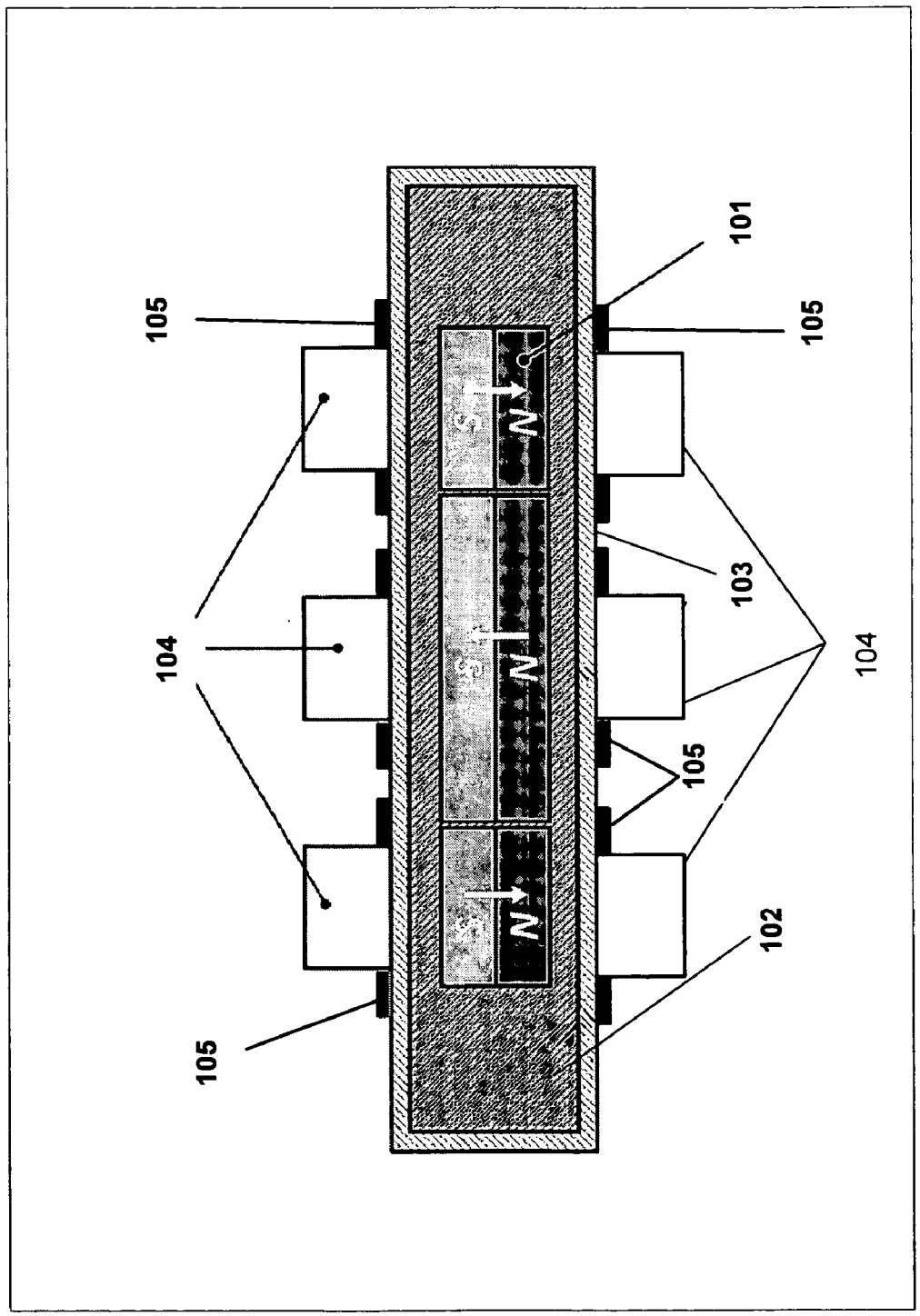
FIG. 1 illustrates a cross-sectional view of an accelerometer that does not use magnetic sensors to detect the position of the inertial body, but still uses magneto-fluidic principles to maintain the position of the inertial body.

FIG. 1 illustrates a cross-sectional view of an accelerometer that does not use magnetic sensors to detect the position of the inertial body, but still uses magneto-fluidic principles to maintain the position of the inertial body. As shown in FIG. 1, a housing 103 encloses magnetic fluid 102, within which an inertial body 101 is suspended. Magnets 104, which may be permanent magnets, or electromagnets, or a combination, are used to suspend the inertial body 101 in place. The inertial body 101 may be magnetized, or may be made of non-magnetic material. For example, if the inertial body 101 is magnetized as shown in FIG. 1, then the magnets 104 may be used to generate a force that both attracts the inertial body 101 in its center, and repels the inertial body 101 at its edges. Alternatively, if the inertial body 101 is non-magnetic, then a second set of magnets 104 (not shown in FIG. 1) may be mounted on the bottom side of the housing 103, such that the inertial body 101 is suspended in the approximate geometric center of the housing 103. 105 in FIGS. 1 and 2 shows exemplary locations of capacitor electrodes.

Figure 2:
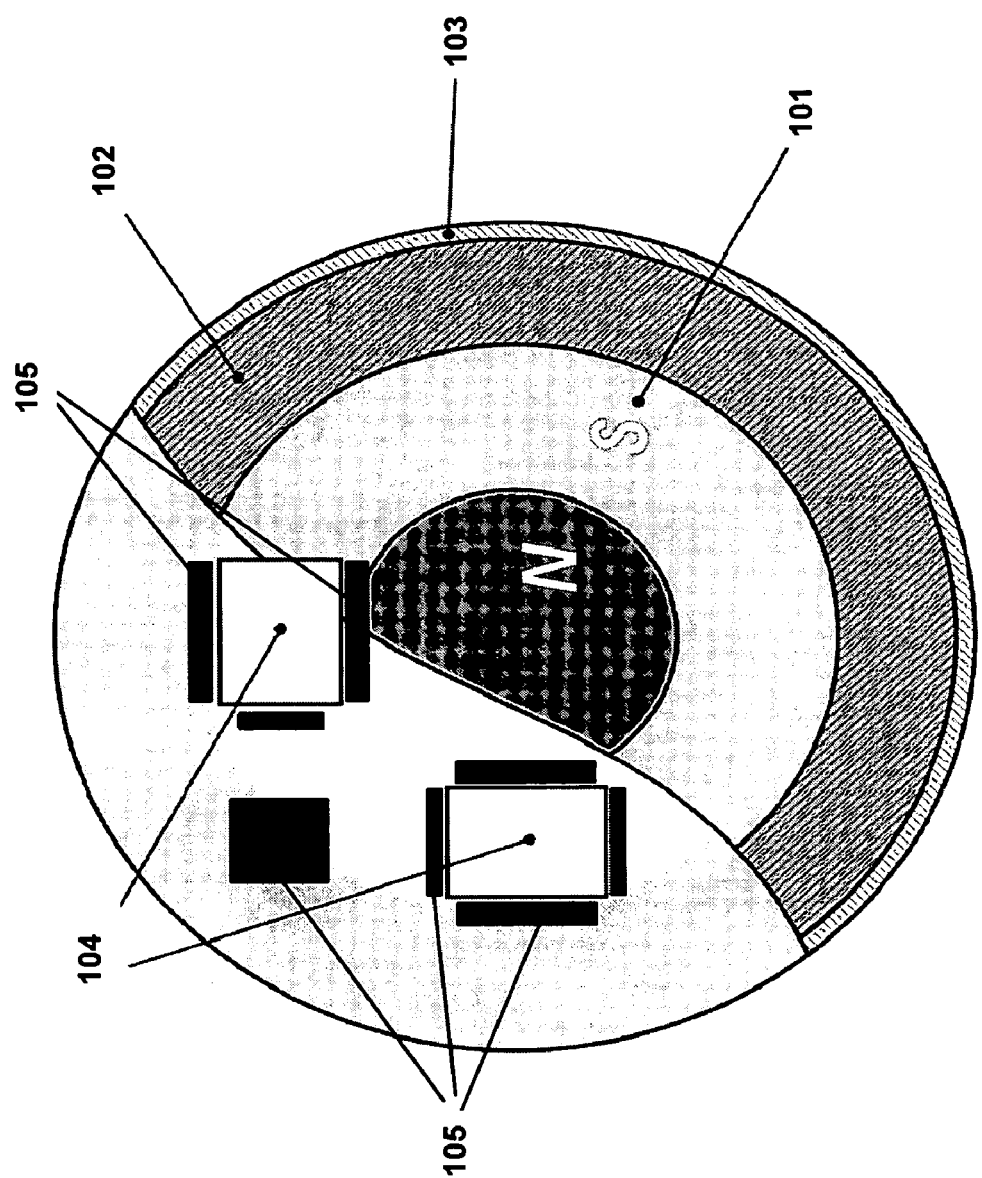
FIG. 2 illustrates a partial cut-away top view of the device shown in FIG. 1.

FIG. 2 illustrates a partial cut-away top view of the device shown in FIG. 1. As shown in FIG. 2, the accelerometer of FIG. 1 may be, for example, roughly circular, or disk-like, or cylindrical, in shape. In one embodiment, the inertial body 101 is a magnet that is annular, with a north-south (in the direction from top to bottom) cylindrical magnet in the center, surrounded by a donut-shaped, or annular shaped, south-to-north magnet. Two of the suspension magnets 104 are shown in FIG. 2. In the arrangement shown in FIG. 2, all the suspension magnets 104 have the same polarity, and the magnets on the bottom side of the housing 103 also have the same polarity, thereby magnetizing the magnetic fluid 102, and suspending the inertial body 101 in place. Note that the magnets can have any number of polarity arrangements and combinations of polarities, not just what is shown in the figures.

It should also be understood that although the device shown in FIGS. 1 and 2 is shown as cylindrical, or disk like, in overall shape, and the inertial body 101 is shown as conformal to that shape, this need not be the case. For example, the accelerometer may be cubical, rectangular, triangular, or any number of other shapes, such as polyhedral, tetrahedral, etc. The electrodes 105 form capacitors, together with the inertial body 101. The value of the capacitance changes in response to displacement, or movement, of the inertial body 101 relative to the housing, which occurs due to acceleration applied to the overall sensor. The value of each capacitor formed by electrode 105 and the inertial body 101 is given by $$C = \varepsilon_r \cdot \varepsilon_0 \frac{S}{d},$$

where $\varepsilon_0 = 8.854 \cdot 10^{-12}$ dielectric constant of space $\varepsilon_r$—relative dielectric constant S—area of the electrode 105 d—distance between the electrode 105 and the inertial body 101.

Here, the inertial body 101 can be viewed as a single electrode, with S being the total area of all the conductive surfaces on the inertial body 101. This is reasonably accurate if the distance between the inertial body 101 and the electrode 105 is substantially less than the dimensions of the electrode 105. The equation above applies to a capacitor formed by the electrode 105 and the inertial body 101, where it is assumed that the inertial body is conductive, or has a conductive coating. If the inertial body 101 has a number of conductive surfaces formed thereon, such that each acts as an electrode of a capacitor, then S will be the area of overlap between the electrode 105 and the conductive surface on the inertial body 101.

When the inertial body 101 is displaced, the distance d between the electrodes 105 changes, which can be detected by circuits that are well known in the art. For example, if the circuit uses the value of the capacitive reactance $X_c$, then $$X_c = \frac{1}{2 \cdot \pi \cdot f \cdot C},$$

where f is oscillator frequency, as a result of displacement of the inertial body 101, the capacitive reactance changes proportionally to the distance between the capacitor electrodes.

Furthermore, it will be appreciated that in addition to the inertial body 101 acting as one electrode of the capacitor, a conductive coating can be applied to the inertial body 101, as well as placing discrete electrodes on the inertial body 101. The geometry of the capacitors formed by such a structure is obviously more complex, although well within one or ordinary skill in the art to calculate the relationship between capacitive reactance, geometry and acceleration.

Figure 3:
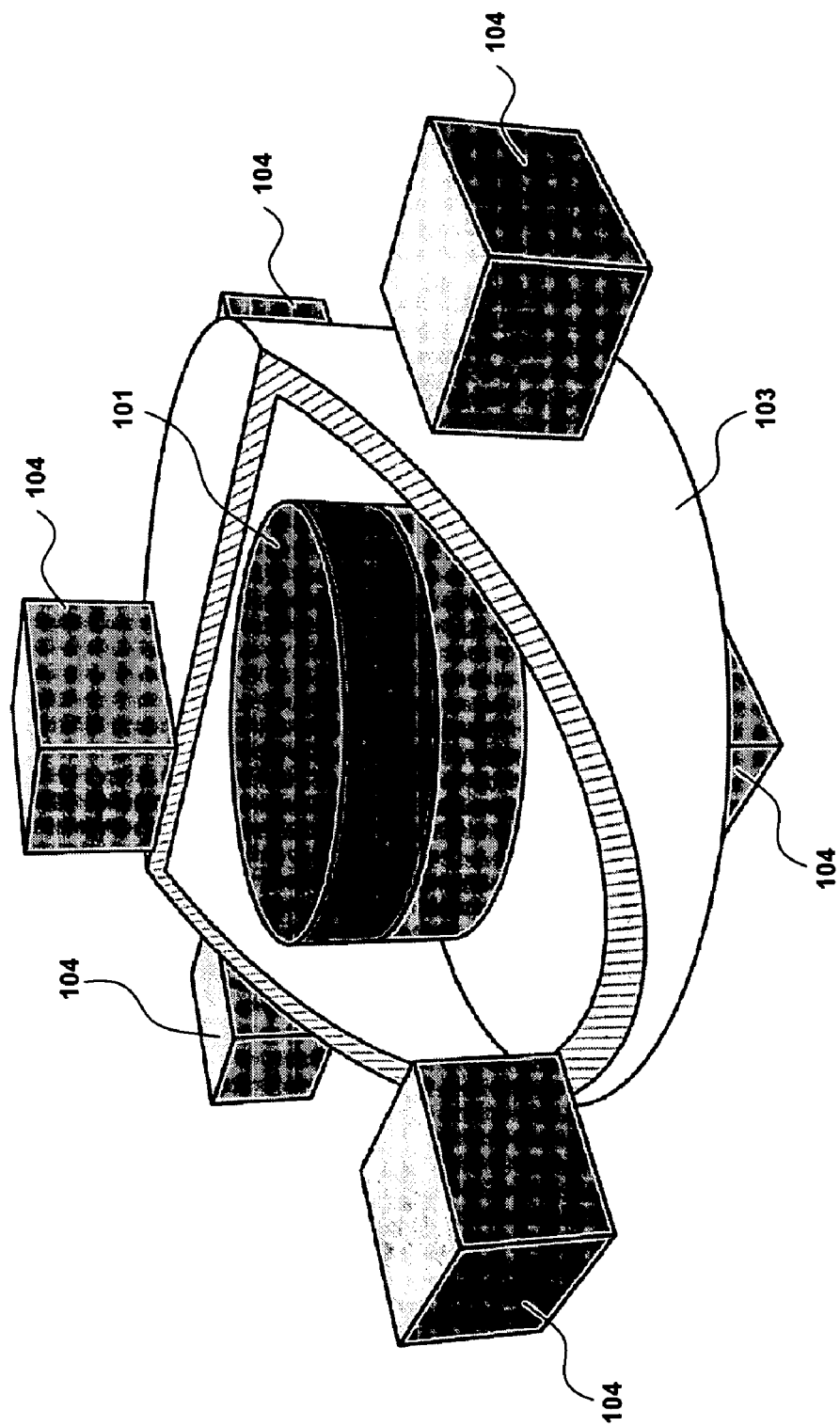
FIG. 3 shows a three-dimensional isometric partial cut-away view of another embodiment of the accelerometer of the present invention.

FIG. 3 shows a three-dimensional isometric partial cutaway view of another embodiment of the accelerometer of the present invention. As shown in FIG. 3, the inertial body 101 comprises a magnet that has only two poles, for example, north on the top, and south on the bottom (relative to the orientation in the figure). The drive magnets 104 are arranged as shown in the figure.

A number of arrangements are possible. For example, the volume within the housing 103 can be entirely filled with the magnetic fluid 102, in which case, the drive magnets 104 can be dispensed with entirely. This, in turn, permits a reduction in the overall dimensions of the sensor. Alternatively, the magnetic fluid 102 can only partially fill the housing 103 (for example, so as to maintain the suspension of the inertial body in the vertical axis, while the drive magnets 104 can be used for maintaining the suspension of the inertial axis in the equatorial plane). As yet another alternative, regardless of whether the housing 103 is filled with the magnetic fluid 102 fully or partially, the magnets 104 can provide a desired relationship between the acceleration and displacement of the inertial body.

In this case, the inertial body 101 itself acts as another "electrode" of the capacitor, with the electrodes 105 forming individual sub-capacitors together with the inertial body 101. Note that the arrangement shown in these figures is only one of many such possible arrangements. Also, the capacitor electrodes 105 need not have the rectangular shapes, but can be annular as well, as well as one annulus surrounding another annulus (not shown in these figures), which in turn surrounds the magnets 104.

As an alternative embodiment, the drive magnets 104 can be avoided altogether, if the inertial body 101 is magnetic. In this case, the magnetic fluid 102 is attracted to regions of strong magnetic field. The magnetic fluid 102 can form "pillows" in those regions, which are used to suspend the inertial body 101 in place, relative to the housing 103.

Generally, it will be understood that a certain number of "capacitors" is needed if measurement of both angular and linear acceleration is desired. In other words, to distinguish a displacement due solely due to angular acceleration from displacement due solely to linear acceleration, it is generally insufficient to have a single capacitor electrode per side of the accelerometer—at least two per side of the "cube" or "cylinder" are necessary to measure both linear and angular acceleration. Furthermore, the addition of extra such electrodes 105 can add to the sensitivity of the device. Note also that although the device shown in FIGS. 1–3 can measure acceleration in six degrees of freedom (three linear and three angular), in some applications, fewer degrees of freedom are needed (for example, only linear acceleration may be of interest, or only two degrees of linear and two degrees of angular acceleration). In this case, fewer electrodes 105 may be needed.

Although not shown in FIGS. 1–3, the inertial body itself can have capacitive electrodes formed thereon. As such capacitive electrodes may be discreet elements, or may be conductive coatings, or may be conductive coatings formed at certain locations, for example, opposite the electrodes 105. Thus, the device illustrated in FIGS. 1–3 (note that capacitor electrodes 105 are not shown in FIG. 3) is a hybrid using magneto-fluidics for suspension of the inertial body 101, and using electrostatics to detect the displacement of the inertial body 101. It will also be appreciated that active suspension principles, for example, as described in U.S. patent application Ser. No. 10/980,791, filed on Nov. 4, 2004, entitled MAGNETOFLUIDIC ACCELEROMETER WITH ACTIVE SUSPENSION, incorporated herein by reference in its entirety can be applied to the accelerometer described herein as well. This may be done in order to increase the bandwidth of the device, by actively regulating the position of the inertial body 101, using a feedback loop.

Figure 4:
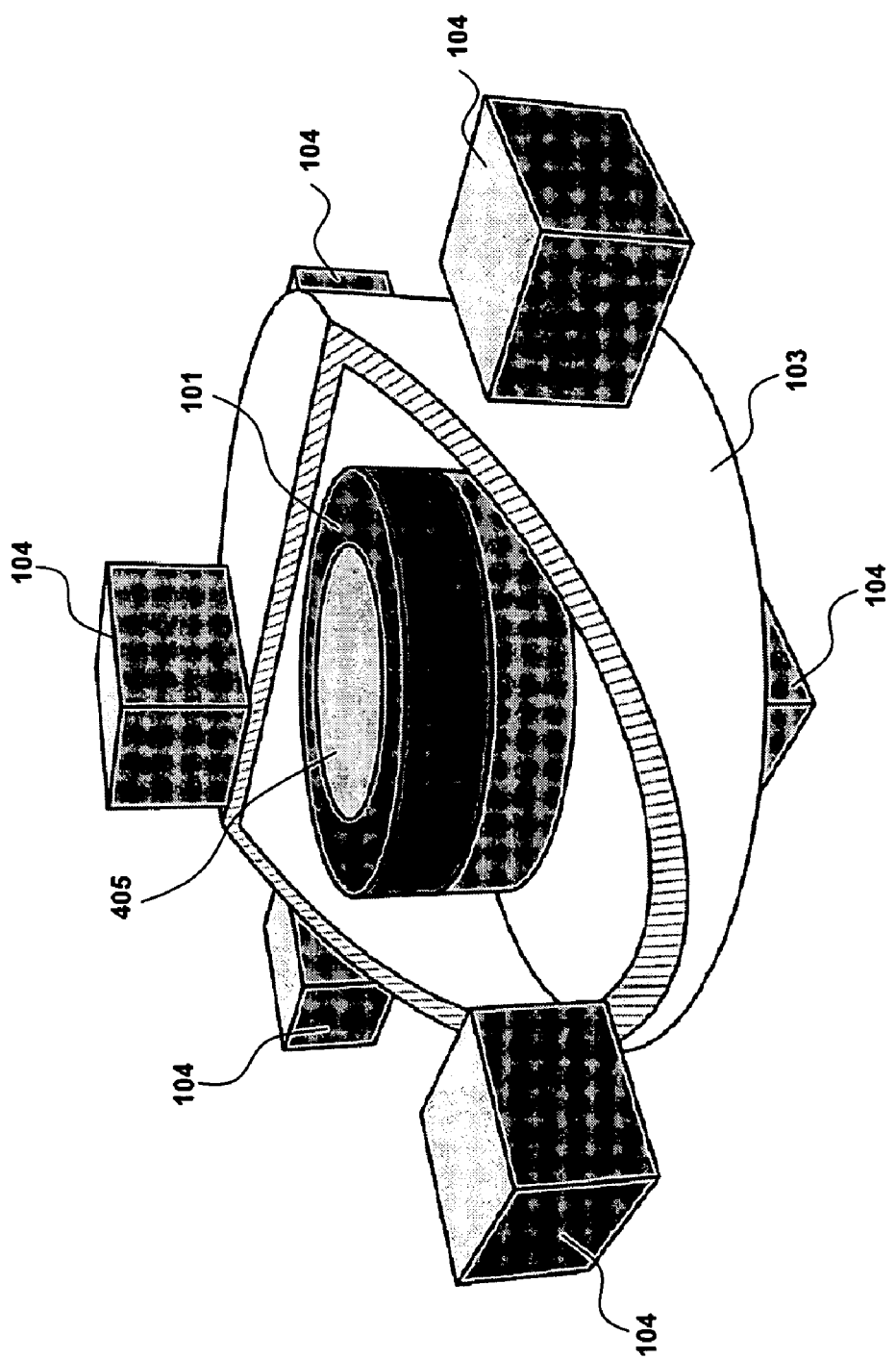
FIG. 4 illustrates another embodiment of the invention.

FIG. 4 illustrates another embodiment of the invention. Element 405 in FIG. 4 is meant to represent a capacitor electrode, which is electrostatically coupled to the capacitor electrodes 105 illustrated in FIGS. 1 and 2 (not shown in FIG. 4 for clarity). The capacitor electrode 405 is therefore coupled to the capacitive electrodes 105 through the magnetic fluid 102 (also not shown in FIG. 4). The inertial body 101 shown here is cylindrical shaped, although the invention is not limited to this shape of the inertial body 101, and may be used with other shapes, such as cubes, parallelepipeds, rectangles, etc. As noted above, the inertial body 101 may be magnetic (shown in FIG. 4 as comprising two disk-shaped poles, or may be a more complex-shaped magnet).

Figure 5:
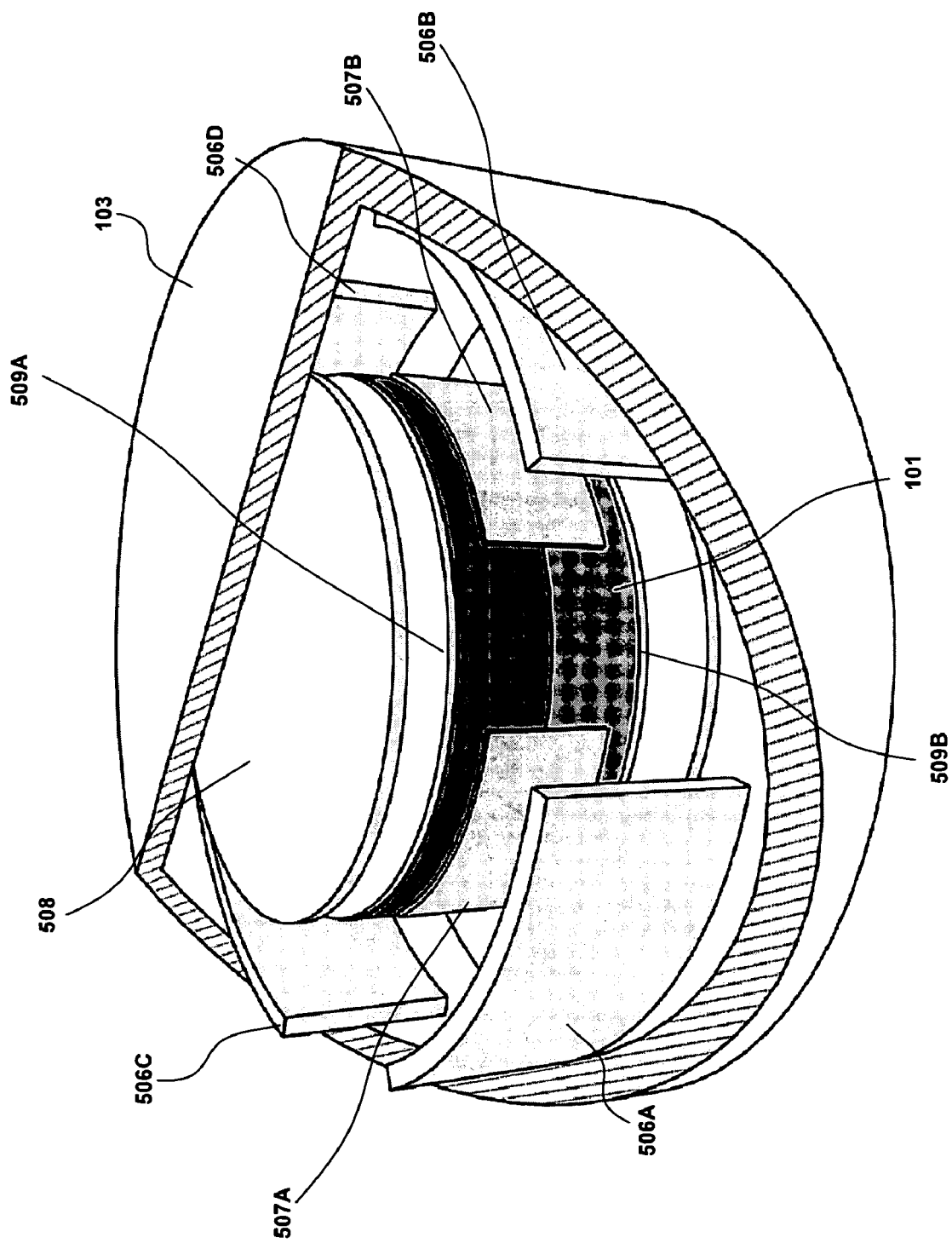
FIG. 5 illustrates another alternative embodiment of the invention, showing more complex arrangements of the capacitor electrodes.

FIG. 5 illustrates another alternative embodiment of the invention, showing more complex arrangements of the capacitor electrodes. Here, with a generally cylindrical shape of the accelerometer, the housing can have curved capacitor electrodes 506A–506D mounted either on the inside, or on the outside of the housing. The inertial body 101 can have conformal capacitor electrodes 507A, 507B (the remaining capacitor electrodes are not shown in this figure). Additionally, other surfaces of the inertial body 101 can have capacitor electrodes 509A, 509B, 508, etc. This arrangement, with curved capacitor electrodes can result in a more compact sensor, although it may require additional discrete components for manufacturing.

Figure 6:
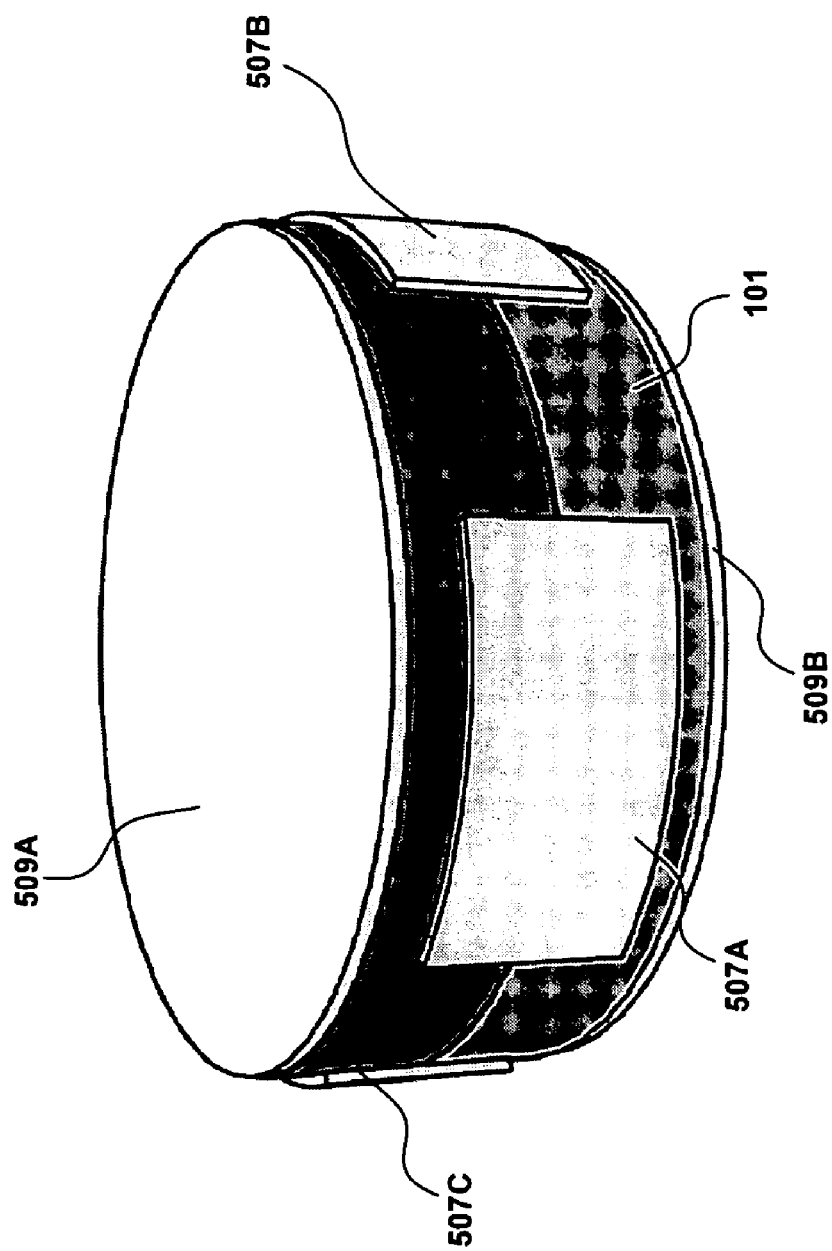
FIG. 6 illustrates another view of the inertial body 101, with the housing 103 removed from the view.

FIG. 6 illustrates another view of the inertial body 101, with the housing 103 removed from the view. Note in particular the capacitor electrodes 507A–507C shown in this figure.

Figure 7:
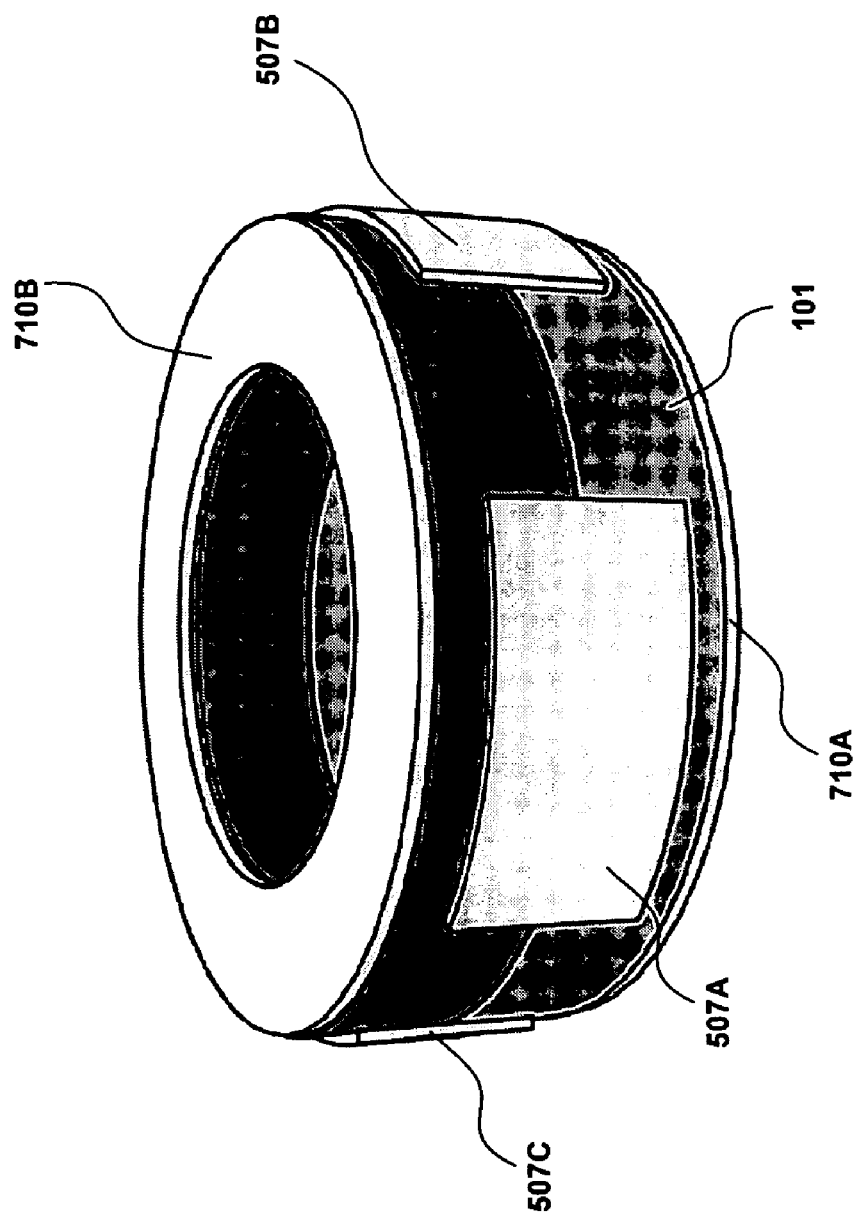
FIG. 7 illustrates yet another embodiment of the invention, with a toroidal-shaped inertial body 101.

FIG. 7 illustrates yet another embodiment of the invention, with a toroidal-shaped inertial body 101. Note in particular the capacitor electrodes 710A, 710B, which is annular, and which can be coupled to either similar annular shapes of the capacitor electrodes 105 mounted on the housing 103, or to sectional annular electrodes, or to other shapes of the capacitor electrodes on the housing 103. Note also that although in this case, the inertial body 101 is magnetic, non-magnetic or weakly magnetic inertial bodies can also be used. Furthermore, although the housing 103 is preferably non-magnetic and non-conductive (for example, made of plastic, brass, or other similar materials), magnetizable as well as conductive materials can be used in some circumstances for the housing 103.

Figure 8:
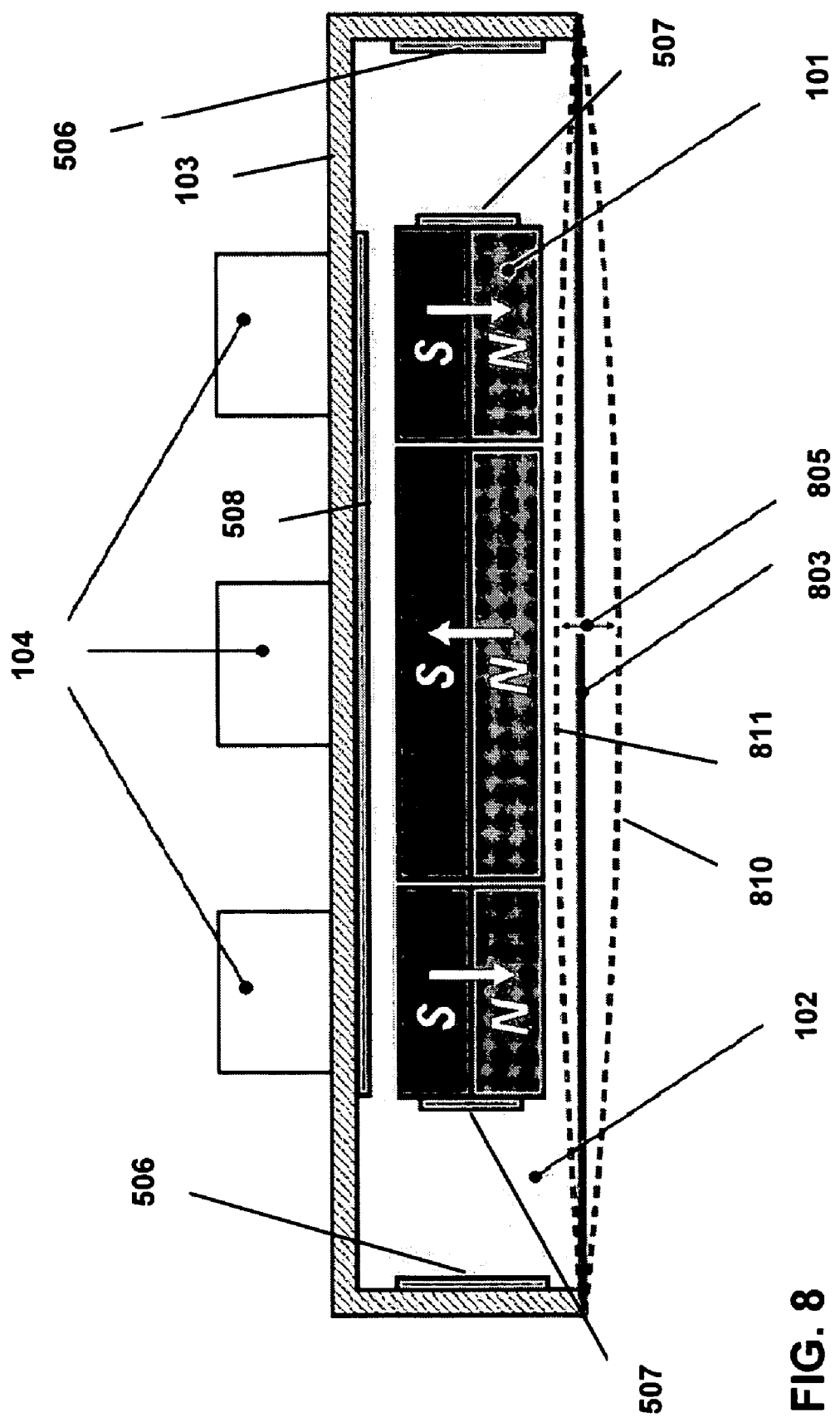
FIG. 8 illustrates an embodiment of the accelerometer with a membrane for thermal expansion.

FIG. 8 illustrates an alternative embodiment of the accelerometer with a membrane for thermal expansion. As shown in FIG. 8, the accelerometer is similar to the one shown in FIG. 1, however, one of the sides of the housing 103 is made of a flexible, and stretchable membrane 803. The as the magnetic fluid 102 shrinks and expands in volume due to thermal effects, the membrane 803 can corresponding "stretch" in and out of the housing 103. The dashed lines 810, 811 show the minimum and maximum extent of the stretching of the membrane 803, and 805 designates the maximum distance that the center of the membrane travels due to thermal expansion of the magnetic fluid 102.

The frequency response of an accelerometer, such as described above, depends on many factors, such as sensor geometry, strength of the magnetic field, amount and type of magnetic fluid 102, inertial body geometry and weight, and other parameters. It may be desirable to expand the dynamic range and the frequency response for certain applications, such as for applications where a vibration needs to be measured accurately. Typical dynamic range for one sensor, such as described in FIGS. 1–8, if the device is approximately 1–2 cubic centimeters in volume and roughly as illustrated in those figures, it is approximately a few g. Typical frequency response is usually a few tens of hertz to perhaps a few hundred hertz.

The present invention has numerous applications. For example, it is applicable to man-machine interfaces that require measurement of motion. It is applicable to active devices that respond to sudden acceleration/deceleration. It is applicable to measurement devices that monitor/adjust constant speed motion, and to monitoring systems that measure and control vibrations in linear or rotational motion. It is applicable to exact positioning for law-enforcement authorities and rescue services personnel, precise positioning and orientation for medical services and emergency vehicles. It is applicable to precise personal navigation tools for travelers. It is applicable to gaming (controllers, manipulators, Virtual Reality). It is applicable to sports, such as training programs, team games and individual games. It is applicable to the entertainment field, such as motion capture. It is applicable to computer input devices (e.g., 3-dimensional computer mice), and 3D CAD Measurement Devices.

Aerospace applications include, e.g., control and inertial navigation of lightweight unmanned aerial vehicles (UAV). Land vehicle applications include vehicle dynamics analysis and dead-reckoning of (D)GPS information of vehicles. Marine industry applications include vessel, buoy and boat navigation and attitude/heading measurement. Bore (drilling) industry applications include borehole measurement for oil and telecom industry. Robotics applications include navigation and dead-reckoning of (D)GPS information of mobile robots. Physical rehabilitation applications include gait monitoring for Functional Electro Stimulation (FES) products. Ergonomics applications include posture registration and load monitoring of workers in construction and assembly industry. Exercise and sports applications include monitoring of athletes' style and performance.

Virtual Reality and Augmented Reality applications include real-time body posture and viewing direction measurement for cave or head-mounted display. PC interface applications include 2D or 3D motion input device for PDAs or PCs, such as 3D computer mouse for CAD and animation designers, video gaming controllers & accessories, radio-controlled vehicle controllers, and sports training devices (e.g. golf, baseball, tennis). Another application involves video devices, such as video cameras, cell phones with video capture, etc. Jitter is a common problem in such devices. To counteract the jitter, it is necessary to know what exactly the jitter is at any given moment. The addition of a sensor of the present invention to such video devices allows the video device to know what is being done to it, so that it can electronically compensate for the jitter. In yet another application, devices that have video display screens can maintain a vertical orientation of the display, even while the display screen itself is being rotated.

Industrial products applications include automotive air-bag activators, vibration sensors, equipment stabilization platforms, seismic sensors (e.g. mining, petroleum), motion capture systems, navigation systems (e.g. dead reckoning in lieu of GPS), and asset/location tracking systems (e.g. cell phone e911 mandate). Seismic applications also include determining a direction of seismic movement. Medical applications include patient monitoring systems, and ergonomic & kinesthetic data acquisition.

Military applications include robotic vehicles (e.g. DARPA Robotic Vehicle Challenge), Predator/Drone remote control, Intelligent Battlefield (e.g. friend-or-foe tracking systems), and ordinance ballistic simulation. It is also applicable to precise positioning of soldiers and machinery in the field and in the air, coordination and guidance of missiles and projectiles (including cases where the GPS signal is either intermittent, unreliable or not available), precise positioning of vehicles, airplanes, helicopters, marine and river transports.

Having thus described embodiments of the invention, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method of measuring acceleration comprising:
   suspending an inertial body using a magnetized magnetic fluid, wherein the inertial body is disk-shaped and includes two electrodes that cover substantially the entire upper and lower surfaces of the disk respectively, and additional electrodes on a curved side surface of the disk that have the shape of a curved surface,
   wherein the magnetic fluid is magnetized using a plurality of magnets oriented generally along an axis of symmetry of the inertial body;
   measuring a change in capacitance generated by displacement of the inertial body due to acceleration; and
   calculating the acceleration based on the capacitive voltage change between the two electrodes and the additional electrodes, and external electrodes.

2. The method of claim 1, wherein the calculating step calculates linear acceleration.

3. The method of claim 1, wherein the calculating step calculates angular acceleration.

4. The method of claim 1, wherein the calculating step calculates three components of angular acceleration and three components of linear acceleration.

5. The method of claim 1, further comprising driving current through a plurality of magnets for generating a magnetic field for magnetizing the magnetic fluid.

6. The method of claim 1, wherein the inertial body is non-magnetic.

7. The method of claim 1, wherein the inertial body is weakly magnetic.

8. The method of claim 1, wherein the two electrodes and the additional electrodes are formed by a conductive coating on portions of a surface of the inertial body.

9. The method of claim 1, wherein the inertial body is annular shaped.

10. A method of measuring acceleration comprising:
suspending a non-magnetic object using a fluid, wherein the non-magnetic object is disk-shaped and includes two electrodes that cover substantially the entire upper and lower surfaces of the non-magnetic object respectively, and additional electrodes on a curved side surface of the non-magnetic object that have the shape of a curved surface;
generating a magnetic field within the fluid using a plurality of magnets oriented generally along an axis of symmetry of the non-magnetic object;
detecting a capacitance change between the two electrodes and the additional electrodes and external electrodes due to a change in position of the object as a result of acceleration; and
calculating the acceleration as a function of the control of the magnetic field.

11. An accelerometer comprising:
an inertial body that is disk-shaped and includes two electrodes that cover substantially the entire upper and lower surfaces of the disk respectively, and additional electrodes on a curved side surface of the disk that have the shape of a curved surface;
a magnetized fluid holding the inertial body in suspension, wherein the fluid is magnetized using a plurality of magnets oriented generally along an axis of symmetry of the inertial body; and
a plurality of external electrodes, each forming a capacitor with the electrodes of the inertial body,
wherein a displacement of the inertial body produces a change in capacitance of the capacitors, the change being indicative of acceleration.

12. The accelerometer of claim 11, wherein the plurality of capacitors comprises at least three capacitive elements per side of the accelerometer.

13. The accelerometer of claim 11, further comprising a housing enclosing the inertial body and the magnetized fluid, wherein the plurality of external electrodes are mounted on the housing.

14. The accelerometer of claim 13, wherein the housing is any of cylindrical shaped, rectangular shaped and tetrahedral-shaped.

15. The accelerometer of claim 11, wherein the inertial body comprises a disk-shaped magnet.

16. The accelerometer of claim 11, wherein the inertial body comprises an annular-shaped magnet.

17. The accelerometer of claim 11, wherein the acceleration comprises linear acceleration.

18. The accelerometer of claim 11, wherein the acceleration comprises angular acceleration.

19. The accelerometer of claim 11, wherein the acceleration comprises three components of angular acceleration and three components of linear acceleration.

20. The accelerometer of claim 11, wherein the inertial body is non-magnetic.

21. The accelerometer of claim 11, wherein the inertial body is weakly magnetic.

22. The accelerometer of claim 11, further comprising a plurality of magnets that magnetize the magnetic fluid.

23. The accelerometer of claim 11, further comprising a housing enclosing the magnetic fluid and the inertial body, wherein the housing includes a stretchable membrane.

24. The accelerometer of claim 11, further comprising a housing enclosing the magnetic fluid and the inertial body, wherein the magnetic fluid partially fills the housing.

25. The accelerometer of claim 11, wherein the inertial body is annular shaped.

26. An accelerometer comprising:
a magnetic inertial body that is disk-shaped and includes conductive coatings that cover substantially the entire upper and lower surfaces of the disk respectively, and additional separate conductive coatings on a curved side surface of the disk that have the shape of a curved surface;
a magnetic fluid in contact with the inertial body, wherein the magnetic fluid is magnetized using a plurality of magnets oriented generally along an axis of symmetry of the inertial body; and
a plurality of external electrodes arranged around the inertial body, each forming a capacitor with the respective conductive coating on the inertial body,
wherein a displacement of the inertial body changes a capacitive reactance of the capacitors, the change being indicative of acceleration.

27. An accelerometer comprising:
a housing incorporating a stretchable membrane;
an inertial body within the housing, the inertial body being disk-shaped and includes conductive coatings that cover substantially the entire upper and lower surfaces of the disk respectively, and additional separate conductive coatings on a curved side surface of the disk that have the shape of a curved surface;
a magnetic fluid in contact with the inertial body, wherein the magnetic fluid is magnetized using a plurality of magnets positioned generally around an axis of symmetry of the inertial body;
a plurality of sensors sensing a change in position of the inertial body due to acceleration, the sensors sensing a change in capacitance of capacitors formed by the conductive coatings and external electrodes.

* * * * *